July 19, 1966  L. H. FOSTER ETAL  3,261,394
REFRIGERATION SYSTEM INCLUDING MEANS FOR RECONSTITUTING
AND PRESERVING FROZEN FOODS AND THE LIKE
Filed April 16, 1963  2 Sheets-Sheet 1
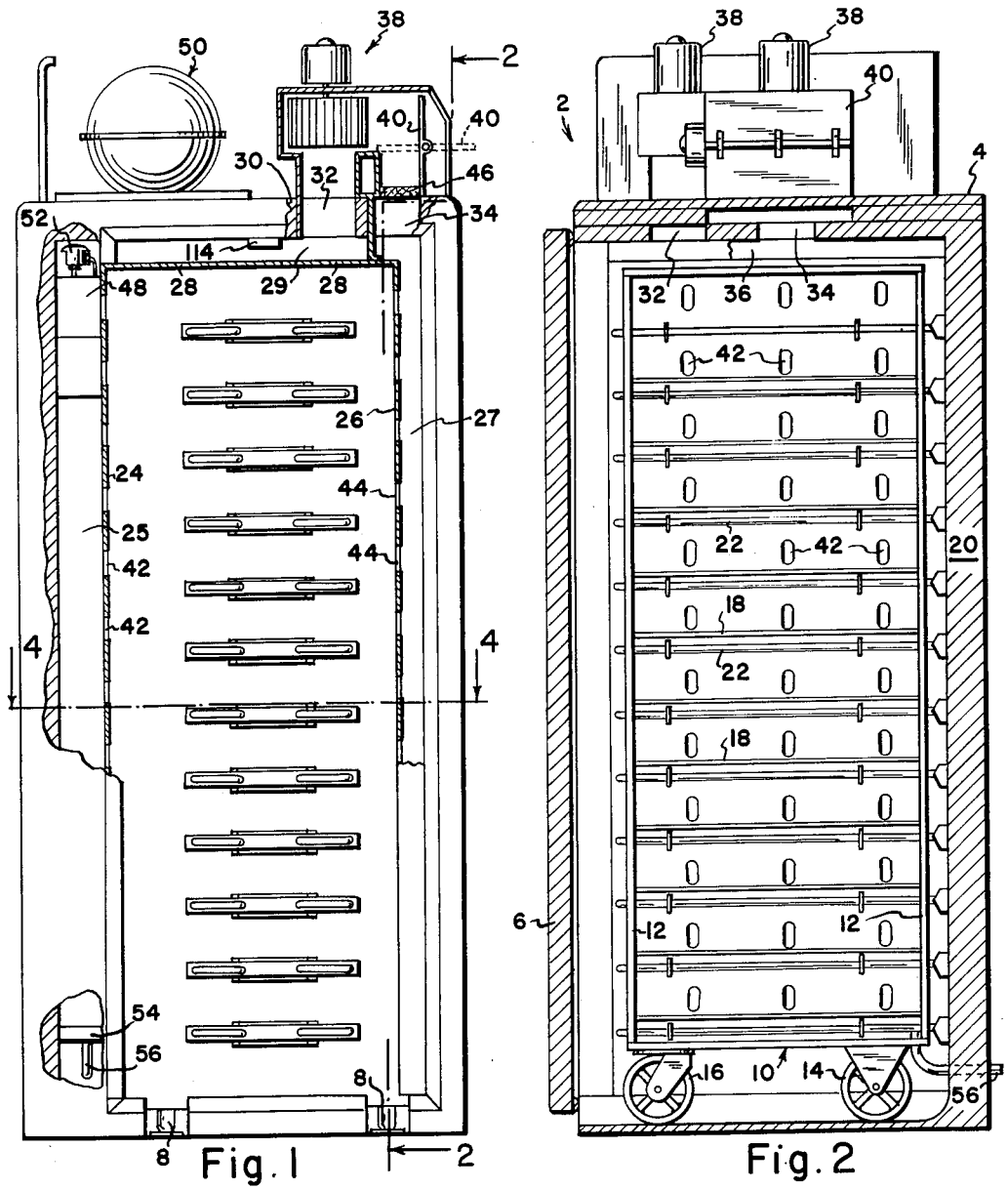
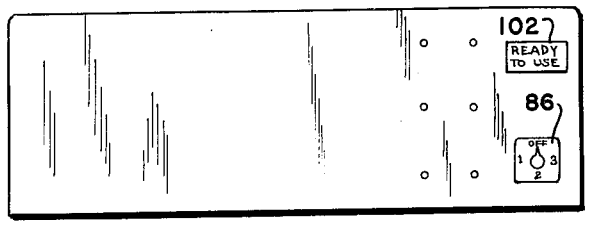
Fig.3
INVENTORS
Lawrence H. Foster
Harold E. Bush
BY
Curtis, Morris & Safford
ATTORNEYS INVENTORS
Lawrence H. Foster
Harold E. Bush
BY
Curtis, Morris & Safford
ATTORNEYS United States Patent Office 3,261,394
Patented July 19, 1966

3,261,394
REFRIGERATION SYSTEM INCLUDING MEANS FOR RECONSTITUTING AND PRESERVING FROZEN FOODS AND THE LIKE
Lawrence H. Foster, Scarsdale, and Harold E. Bush, Hudson, N.Y., assignors to Foster Refrigerator Corp., Hudson, N.Y., a corporation of New York
Filed Apr. 16, 1963, Ser. No. 273,452
11 Claims. (Cl. 165—12)

This invention relates to refrigeration and to food preservation; and, to the processing of frozen food to reconstitute it for consumption. The invention relates particularly to processing frozen foods to preserve the desired qualities of taste, texture and nutritive values during and after the reconstituting of the foods for consumption.

Great strides have been made in the freezing, storing and handling of frozen foods so as to maintain the various desirable characteristics. However, difficulties are still encountered in the proper handling of the food shortly prior to consumption. This is a very serious problem in establishments where large numbers of people are fed.

Many foods are now packaged and frozen after having been fully prepared for consumption so that the food is merely reconstituted (i.e. thawed and heated to the desired temperature for immediate use). Such foods are generally enclosed in a sealed package, for example, in a disposable tray or dish and covvered or enclosed in transparent plastic film. In such condition the packages are stored at a sub-zero temperature, and they may be inspected at any time or placed on display to the potential customer or consumer. It has been found that a number of different foods in the desired quantities for an entire meal can be packaged in such a way as to be extremely attractive, with each of the various foods having an attractive appearance similar to that which it had prior to freezing.

However, even though the frozen food in storage is in excellent condition in all respects, great difficulty is still encountered in "reconstituting" the food for consumption. In many cases the food is seriously damaged during thawing or during heating. In other cases the damage is not serious, but there is objectionable impairment of the desirable quality characteristics such as taste, appearance, and vitamin content. Hence, frozen foods that reach the kitchen with all their original desirable qualities are often served in quite inferior condition.

Foods have been placed in a hot oven while still in the fully frozen condition, with the result that the outside has become overheated and somewhat damaged prior to the time when the foods were fully thawed. With such a procedure it is difficult to be certain when the foods are completely thawed, so that some foods have been served while still partly cold or even frozen. This is especially true when a single package contains foods of different shapes, sizes, and heat-absorbing and thawing characteristics, such as is true of a packaged meal which contains meat and vegetables.

Another serious difficulty which has been encountered, has been the "time element" involved in reconstituting frozen foods. Illustratively, the foods may be in "permanent" storage at a temperature of the order of minus 10° F., and they may be removed and stored at a temperature somewhat above freezing for a period of time sufficient to permit complete thawing before being heated for consumption. However, that procedure makes it necessary to anticipate the consumption needs and to remove the desired quantity of foods from the "permanent" storage twelve to twenty-four hours ahead of time. Even this time-consuming method, however, does not always prevent certain foods from deteriorating during the long period of thawing or later.

Another serious problem has been that there has been no equipment available by which frozen foods could be preserved properly during the reconstituting procedure and prior to use. The principal difficulty has been that the emphasis has been placed upon merely heating the food, whereas it is a refrigeration and food preservation problem. Certain foods deteriorate rapidly when thawed very slowly by prior procedures, because the center of a body of food may be at a temperature below freezing while the outside is at a relatively high temperature. With such a condition there is a zone between the center and the outside which is maintained at a temperature where rapid deterioration takes place, and that portion of the food may become unfit for consumption.

It is an object of the present invention to provide for the reconstituting of frozen foods in an improved manner. It is a further object to provide for the storage and handling of frozen foods so as to prevent a deterioration of quality. It is a further object to provide efficient and dependable methods and apparatus for thawing frozen foods and for storing them before and after the thawing operation without damage to the foods or impairment of the desirable qualities. It is a further object to overcome the difficulties which have been encountered in reconstituting frozen foods. It is a further object to provide for quick and efficient reconstituting of frozen foods so that the foods may be maintained in low temperature storage until the specified demand is ascertained.

It is a further object to provide apparatus for carrying out the above in an efficient and dependable manner. It is a still further object to provide refrigeration equipment for the storage of the food in frozen condition, which may be used to elevate the temperature and thaw the food and thereafter preserve it in refrigeration condition until use. These and other objects will be in part obvious and in part pointed out below.

In accordance with the present invention the foods are reconstituted by maintaining them in refrigerated condition and yet heating them by pulsating heat in accordance with a predetermined plan or program.

In the illustrative embodiment of the invention the foods are removed from storage and placed in a refrigerated cabinet which maintains them in frozen condition. When it is desirable to reconstitute the foods, they are subjected to pulses of radiant heat in accordance with a predetermined time schedule. The pulses of heat are of controlled intensity and time, and between each pulse and the next there is a predetermined time delay. The timing and duration of the impulses is varied depending upon the particular food (or combination of foods) and its (or their) characteristics. When the food has been fully thawed, it may be heated immediately or stored for later consumption at a temperature which preserves its desirable qualities. After thawing, the food may be heated in many different ways. During thawing and any subsequent above-freezing storage, it is preferable to confine the foods so as to control the ambient temperature.

Within the cabinet the packages of frozen foods, which may be on trays or the like and covered by transparent film, are supported upon shelves, and above and below each shelf there is an electric radiant heating element. These heating elements are energized to produce radiant heat. The radiant heat passes through any transparent wrappings so that it is delivered directly to the food. The radiant heat from beneath the package is delivered to the packaging material and passes by conduction to the food. Air circulation is provided to maintain the desired temperature and humidity of the air within the cabinet. Automatic timing means is provided for energizing the heater elements, and the cabinet is provided with refrigeration means to cool the interior of the cabinet immediately after the food has become completely thawed. This permits the food to become stabilized at a predetermined temperature at which it is preserved until it is heated for consumption. It was found that the heating of the food prepared in that manner could be carefully regulated and that each food reached the consumer in prime condition.

Referring to the drawings wherein one embodiment of the invention as shown:

FIGURE 1 is a front elevation with parts broken away of a refrigerated reconstituting cabinet;

FIGURE 2 is a sectional view on the line 2—2 of FIGURE 1, but including a removable cart positioned within the cabinet;

FIGURE 3 is a front elevation of the control panel which is positioned at the top of the cabinet of FIGURE 1;

Figure 4:
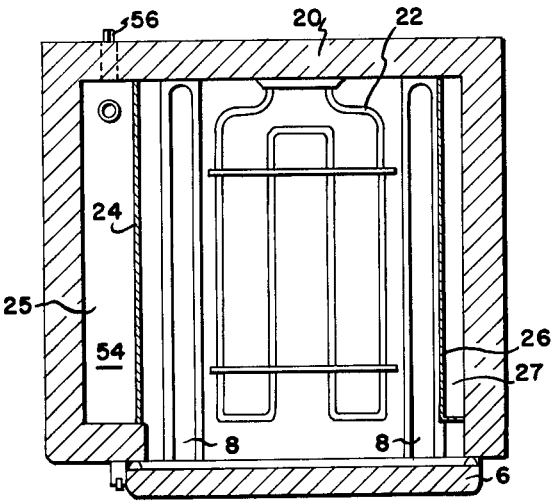
FIGURE 4 is a horizontal section on the line 4—4 of FIGURE 1.

Referring to FIGURE 2 of the drawings, a cabinet type refrigerator 2 has a cabinet 4 with a swinging door 6 and having a pair of tracks 8 (see FIGURE 1) to accommodate a push cart 10 (FIGURE 2). Cart 10 has a rigid rectangular frame with four corner side posts 12 and with four wheels, there being two wheels 14 at the right and two casters or pivot wheels 16 at the left. Hence, when door 6 is open the cart may be pushed to and from the cabinet with the wheels in the tracks 8 (as shown in FIGURE 2). Cart 10 has eleven open wire shelves 18 which are removably supported by the corner posts 12 and which are adapted to support food to be reconstituted.

Rigidly mounted from the rear wall 20 of cabinet 4 are twelve heater elements 22 (see also FIGURE 4) which are tubular sheathed electric heaters, each formed by a continuous element bent to form four inner-connected longitudinal portions. The heater elements and shelves 18 are so disposed that each shelf is positioned approximately one inch above and three and one-half inches below a heating element. Hence, an average package of food placed upon a shelf will be positioned substantially midway between two heater elements. The open wire shelves permit the ready passage of the radiant heat from the heater elements to the packages from the bottom, and each package is exposed directly to the heater element above it.

Referring to FIGURE 1 there is a sheet metal liner 24 which provides a vertical air passageway 25 between the liner and the left-hand cabinet wall, and there is a similar liner 26 at the right forming a passageway 27; and, a top liner 28 spaced from the top wall 30 forms a passageway 29. Top wall 30 has an air outlet opening 32 and an air inlet opening 34, and positioned between these openings is a sheet metal baffle 36 (in cross-section in FIGURE 1 and partially cut away in FIGURE 2 to reveal outlet opening 32), which baffle 36 blocks the air passageway 29. A pair of blowers 38 (see also FIGURE 2) draw air from outlet passageway 32 and direct it to the right (FIGURE 1) where it is directed downwardly by a damper 40 through the air inlet passageway 34 to the vertical passageway 27.

Liner 24 (FIGURE 2) has a plurality of air openings 42, and liner 26 has identical air openings 44 (FIGURE 1). Hence, with damper 40 positioned as shown the operation of blowers 38 circulates air from the top passageway 29 through the blowers and thence downwardly through passageway 27 where it is distributed through the outlets 44 directly over the shelves and the packages of food supported thereon. The air flows across the cabinet and through openings 42 into passageway 25 through which it flows upwardly to passageway 29. As will be explained more fully below, damper 40 may be moved to its horizontal position (shown in broken lines) so as to discharge air from the blowers outwardly above the damper, and so as to draw outside air in below the damper and thence downwardly through passageway 27, from which it flows as discussed above. An air filter 46 is positioned in passageway 34.

Figure 5:
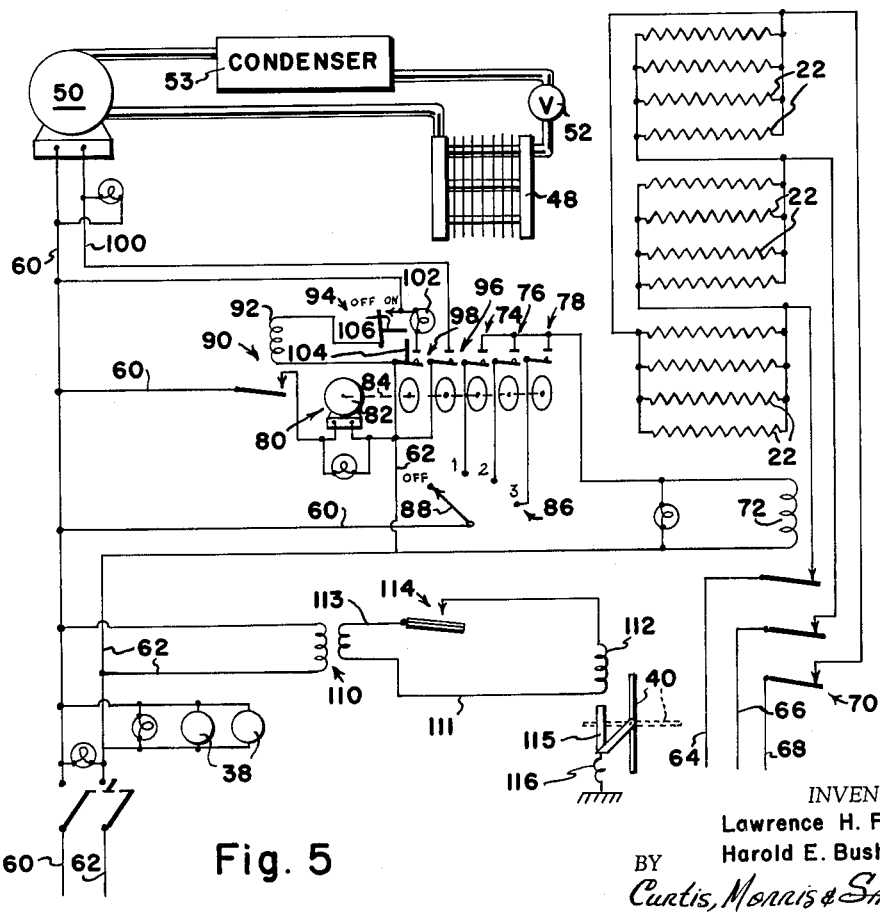
FIGURE 5 is a schematic representation of the refrigeration and electrical systems together with the control units.

At the top of air passageway 25 there is the evaporator 48 of a refrigeration system which has a motor-compressor 50 and an expansion valve 52 (see also FIGURE 5). The condenser 53 for the refrigeration system is not shown in FIGURES 1 or 2. The lower end of passageway 25 is provided with a condensate pan 54 in which condensate from evaporator 48 collects and from which it is discharged through a drain pipe 56. Hence, when a cart with food thereon is positioned in the refrigerated cabinet, the refrigeration system is operated to maintain the desired air temperature and the blowers 38 circulate the air constantly, with damper 40 being in a vertical position as shown in full lines. As will be explained more fully below, during the period of time when the heater elements are energized the refrigeration system may not be operated and damper 40 may be moved to and from its broken-line position to discharge heated air and draw in replacement cool air. In that way the temperature of the air within the cabinet may be maintained with the desired range without operating the refrigeration system.

Referring now to FIGURE 5 wherein the refrigeration system and the electrical supply and control systems are represented schematically, the main power supply is from a pair of 230 volts A.C. lines 60 and 62 and a 400 volt A.C. three-phase source connected through lines 64, 66 and 68. The heater elements 22 are connected in three groups, each group constituting four of the heater elements connected in parallel. The three groups are then connected by the three switches of a relay 70 across the respective three phases of the power supply of lines 64, 66 and 68. Relay 70 has a solenoid 72 which is connected at one side to line 62 and at the other side it may be connected to line 60 through any of three cam switches 74, 76 and 78 of a program timer 80. Thus, the heater elements are energized by the closing of any one of these cam switches.

Timer 80 has a constant speed motor 82 which drives five cams through a shaft 84. Each of the cams for switches 74, 76 and 78 is adapted to be adjusted to close its switch for a selected number of seconds and then open its switch for a selected number of seconds, thus, completing a timed impulse heating cycle. Therefore, the cams for these three switches permit the operator to set three different impulse heating cycles. A manual selector switch 86 has a switch arm 88 which is connected to line 60 and may be swung from the "off" position shown to any one of the three numbered contacts. These numbered contacts are connected respectively to the cam switches 74, 76 and 78 so that the operator sets the switch arm to the cam switch which has been adjusted to the impulse heating cycle which he wishes to select.

Timer motor 82 has one side connected to line 62 and it is adapted to be connected at its other side to line 60 through a relay 90, which has a solenoid 92. Solenoid 92 is also connected at one side to line 62 and at the other side it may be connected to line 60 through a manual switch 94 which may be swung to the right from the "off" position shown into its "on" position. The program timer also has a cam switch 96 which controls the refrigeration system and light cam switch 98. The closing of switch 98 lights a bulb 102 which indicates that the operation is completed and that the food is "Ready for Use." The circuit for bulb 102 is from line 60 through the bulb and thence through the switch to line 62. The refrigeration compressor motor 50 is connected at one side to line 60 and at the other side through a line 100 to switch 96 which is connected at its other side to line 62.

As indicated above, the cams for switches 74, 76 and 78 control the individual impulse heating cycles by energizing the heater elements 22 for a predetermined period of time and then de-energizing the heater elements for a predetermined period of time. However, cam switch 98 controls the total time during which the heating operation is carried on and, therefore, its cam is adjusted to regulate the number of impulse heating cycles to which a particular quantity of food is subjected during the reconstituting operation. Hence, the impulse heating operation for a particular quantity of food is initiated by closing the manual switch 94 so as to energize relay 90 and start motor 82. The heaters are then energized in accordance with a particular program which has been set by manually turning switch arm 88 of switch 86. When the selected number of impulse heating cycles has been completed, switch 98 is closed by its cam and the closing of this switch moves an arm 104 against an arm 106 and opens switch 94. Simultaneously, the "Ready To Use" light 102 is energized, thus indicating to the operator that the operation has been completed.

The blowers 38 receive power directly from lines 60 and 62 and operate continuously. The damper control is energized from lines 60 and 62 through a transformer 110 and a thermostatic bimetallic switch 114 positioned in passageway 29 so as to be responsive to the temperature of the air which is passed through the cabinet. A line 111 extends from the secondary of the transformer directly to a damper solenoid 112, and the other side is connected through a line 113 and switch 114 to the other side of the solenoid. When solenoid 112 is not energized, damper 40 is held in its vertical position by a spring 116, but when the solenoid is energized an armature 115 is drawn upwardly so as to swing the damper to its horizontal position. Hence, the closing and opening of switch 114 controls the swinging of the damper from the air recirculating position shown in FIGURES 5 and 1 and the horizontal position wherein air is discharged above the damper and cool air is drawn in below the damper.

The following examples are illustrative of the tests which have been carried on in accordance with the present invention:

Example 1

A single serving of high quality ground beef was cooked to "rare" condition, that is, the interior was light red or pink, and it was then frozen and stored at minus four degrees Fahrenheit (−4° F.) for an extended period. The meat was removed from storage and immediately placed into a closed cabinet in a tray approximately two inches below a tubular sheathed electric radiant heater element. The heater element was energized for impulses of fifteen seconds each with an interval of one hundred and forty seconds between the end of each impulse and the beginning of the next. In other words, the complete heating cycle was a period of one hundred and fifty-five seconds; an "on" period of fifteen seconds during which the heater element was energized and an "off" period of one hundred and forty seconds during which the heater element was not energized. At the end of the eighth such heating cycle the meat directly below the top surface had reached 32° F. as indicated by a thermocouple positioned 1/32 of an inch below the top surface of the meat. This temperature increased quite rapidly during the first cycle from the initial −4° F., and passed through 0° F. at approximately 10 seconds after the beginning of the cycle. The Fahrenheit temperatures at the ends of the respective heating cycles were: 4°, 11°, 16°, 20°, 22°, 25°, 28°, and 32°. During the initial cycles the temperature increased rather steadily throughout the "off" and "on" periods, but when the temperature was between 22° F. and 32° F. the temperature increase was primarily during the "on" periods, i.e., when the heater element was energized. The temperature at the center of the meat (i.e. ½ inch from the top surface) followed a steadier pattern with a substantially uniform rate of increase in temperature even through the actual thawing zone.

Example 2

A single serving of cooked sliced potatoes in a sauce was prepared for consumption and then was frozen and stored at 0° F. for an extended period. The frozen potatoes were then reconstituted in a manner identical with the procedure of Example 1 above. While the desired qualities of the reconstituted potatoes were retained, it is significant that the temperature variation near the top surface of the potatoes followed a different pattern than with Example 1. During each cycle the temperature at the top surface of the potatoes rose only during the "on" period. During the first cycle that temperature reached 8° F. and during the second cycle it reached 16° F. During the third cycle that temperature reached 24° F., but it dropped during the "off" period to 22° F. In subsequent cycles that temperature reached 29° F., but dropped to 27° F.; reached 36° F., but dropped to 32° F.; and, reached 38° F., but dropped to 34° F. During that time, the Fahrenheit temperature at the center of the potatoes rose steadily through the "off" and "on" periods and those temperatures at the ends of the respective cycles were 8°, 15°, 20°, 23°, 26°, 30°, and 32°.

We are not certain that we understand fully the scientific basis for the outstanding results which are attained in practicing the present invention. Nevertheless, we believe that the following is pertinent to an understanding of the invention and constitutes an explanation of certain of the phenomena involved in the preferred embodiments of the invention:

The basic principle of the present invention appears to be subjecting the foods to "impulse heating," which term is used herein to mean heating in accordance with a predetermined time schedule or program in the form of a series of time cycles, with each cycle comprising a period of intense heating followed by a period of no heating. The heating is in the form of radiation which acts like light so that it passes through transparent wrappings and is absorbed by the surface layers on the food and the non-transparent wrappings. The temperature of each such surface layer is thereby elevated at a very rapid rate. However, when the heating is discontinued in the "off" period the heat from this surface layer passes by conduction to the interior of the food. Also, the temperature of the circulating air is maintained high enough to deliver heat to the food by convection. Hence, during each of the series of heating cycles a quantity of heat is delivered to the food until the food is completely thawed. However, during each "on" period the temperature of the outer layer is not elevated sufficiently to cause any objectionable change in the food. The heating cycles are of such duration as to provide rapid reconstituting of the food and a sufficient number of heating cycles is carried on to bring the food to the desired temperature at which the food may be stored. Within the period of time when a particular portion of food is approaching the thawing temperature, it is believed that certain of the crystalline or frozen juices may be thawed and refrozen particularly near the surface where the heat is being applied. However, the experience with various foods has indicated that any such thawing and refreezing does not damage the foods when care is taken to properly control the cycling operations. It should be noted that the invention permits a wide range of operation in that the following factors may be varied: The length of the heating period of each cycle; the length of the cycle; the intensity of the heating; and, the ambient temperature.

It should be noted that radiant heating is very advantageous in that it delivers heat to the surface of the foods in a controlled and dependable manner. Transparent wrappings permit the passage of radiant heat with reasonable efficiency and without damage to the wrappings. Furthermore, radiant heat can be delivered with relatively high intensity and yet can be turned off and on rapidly and without the difficulties which might be encountered with convection heating.

In the illustrative examples, the foods were stored in the cabinet at a subfreezing temperature and subsequently heated to temperatures for consumption. After being thawed, the foods were stored at a temperature which permitted them to be stabilized at a temperature above freezing. In that condition, foods can be heated by radiant heat or by convection, or they may be heated by high-frequency electrical equipment. However, when foods are being stored in thawed condition, it is simple matter to heat the food to the temperature for consumption utilizing the impulse radiant heating equipment. Furthermore, it is not necessary to store the food for any period of time after being thawed, and the "program" or predetermined time cycle may be worked out to continue the heating from the frozen food stage to the fully heated food stage. The pulsating heat and the circulation of air insures that the packaging materials will not be damaged even when the foods are heated to condition for consumption. Also, the foods maintain color and "eye appeal" during the entire operation.

The control panel of FIGURE 3 includes the selector switch 86 for selecting the particular program or predetermined heater cycle operation. Hence, the operator may change the program readily by turning the switch arm. The control panel also includes lights indicating the conditions of the system; for example, that the refrigeration system is operating or that the radiant heaters are energized. Also, during the "off" period each impulse heating cycle, the food is receiving heat by convection from the air which is circulated, and that condition is also indicated by a light. At the termination of the cycle the "Ready To Use" light turns on to alert the operator that the food has been reconstituted. In the two examples referred to above, the frozen food was cooked and prepared for consumption prior to freezing. It is understood that uncooked meats and other such products may be stored and reconstituted by the present invention, and that the term "food" is used in that sense.

As many possible embodiments may be made of the method, apparatus and product features of the above invention and as the art herein described might be varied in various parts, all without departing from the scope of the invention, it is to be understood that all matter hereinbefore set forth is to be interpreted as illustrative and not in a limiting sense.

We claim:

1. In apparatus of the character described for reconstituting frozen foods, the combination of, a cabinet which encloses a reconstituting space within which the frozen food may be positioned during the reconstituting operation, said cabinet having a side door and track means adjacent said door, a removable cart for frozen food positioned within said reconstituting space on said track means and adapted to be moved therefrom, said cart having shelves which provide spaced supporting surfaces upon which the frozen food is supported with the items of food having surfaces which are exposed through the planes of said supporting surfaces, means to provide cool air to said reconstituting space in said cabinet, a plurality of radiant heater elements mounted upon a wall of said cabinet and projecting respectively between the shelves of said cart with there being a heater element positioned to radiate heat to the exposed surfaces of each item of food through each of the planes of support and upon the sides opposite thereto, and control means to energize said heater elements in accordance with time-spaced heating cycles whereby the exposed surfaces of the items of food are subjected to time-spaced heat pulses with each pulse separated from the next by a time interval.

2. In apparatus of the character described for reconstituting frozen foods and maintaining the desired conditions of quality, the combination of, cabinet means providing a reconstituting space, means to move portions of food to and from said space and to support the portions of food individually while within said space, radiant heating means which is adapted to subject the portions of food to pulses of heat while said portions are within said space, said heating means comprising a plurality of horizontally disposed heater elements, said means to move portions of food including a plurality of spaced support means which are adapted to support said portions of food and to move them horizontally to and from the spaces between said heater elements, and control means for controlling said heating means.

3. In apparatus of the character described for thawing frozen products and maintaining the desired conditions of quality, the combination of, cabinet means providing a space within which the products are positioned while the thawing is taking place, means to support the products when they are moved within said space with the products presenting exposed surfaces which are to be subjected to radiant heat, electrical radiant heating means mounted within said cabinet and positioned adjacent to said exposed surfaces of the products supported by said means to support products and adapted to produce pulses of radiant heat directed to said exposed surfaces, means to provide air of controlled temperature in said space so as to maintain the air adjacent said exposed surfaces below a predetermined temperature, and an electrical supply circuit for supplying electric current to said radiant heating means including a cyclic timer connected to control the energization and de-energization of said radiant heater means including switch means and means to close and open said switch means to alternately energize and de-energize said radiant heater means to produce a series of time-spaced heat pulses with each pulse separated from the next by a time interval.

4. Apparatus as described in claim 2 which includes, air circulating means to circulate air past the food in said cabinet, and control means to control the temperature of the circulated air.

5. Apparatus as described in claim 4 wherein the said control means to control the temperature of the air includes a damper which is adapted to be moved between a position wherein the air is recirculated through the cabinet and a position wherein air is discharged from the cabinet and additional air is drawn into the cabinet.

6. Apparatus as described in claim 1 wherein said radiant heaters are tubular sheathed electrical heaters positioned horizontally within said cabinet so that food may be positioned between them.

7. Apparatus as described in claim 4 which includes control means to stop the operation of said means to circulate air and to continue the heating of the food to the temperature for consumption.

8. Apparatus as described in claim 4 wherein said cabinet has vertical air conduits for discharging air horizontally into the cabinet and for receiving the air from the cabinet and said air circulating means comprises blower means.

9. Apparatus as described in claim 2 wherein said means to move portions of food comprises a cart which is adapted to be moved into and out of said space.

10. Apparatus as described in claim 2 which includes a refrigeration system having an air-cooling evaporator, blower means to circulate air into heat exchange relationship with said evaporator and thence horizontally through said space to maintain a controlled temperature condition within said space.

11. Apparatus as described in claim 2 wherein said control means comprises a cyclic timer which has a plurality of time-cycle units which are selectively energized to provide different selected heating cycles.

(References on following page)

References Cited by the Examiner

UNITED STATES PATENTS

| 3,506,448 | 5/1950 | Gregor | 62—159 |
| 2,917,988 | 12/1959 | Harris | 99—327 |
| 3,078,688 | 2/1963 | Petkwitz | 62—159 |
| 3,108,173 | 10/1963 | Barrett et al. | 99—107 |
| 3,131,756 | 5/1964 | Quirk | 165—27 X |

OTHER REFERENCES

Publication: "Electronic Heating for Frozen Foods" (Dr. E. W. Eickelberg), published in Quick Frozen Foods, July 1950, page 48.

ROBERT A. O'LEARY, *Primary Examiner.*

CHARLES SUKALO, *Examiner.*

N. R. WILSON, *Assistant Examiner.*